(12) United States Patent
Tanaka (10) Patent No.: US 12,210,554 B2
(45) Date of Patent: Jan. 28, 2025

(54) NODE PROCESSING APPARATUS, NODE PROCESSING METHOD AND PROGRAM (71) Applicant: DAIKIN INDUSTRIES, LTD., Osaka (JP)

(72) Inventor: Misaki Tanaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 197 days.

(21) Appl. No.: 17/758,739

(22) PCT Filed: Jan. 20, 2021

(86) PCT No.: PCT/JP2021/001852
§ 371 (c)(1),
(2) Date: Jul. 13, 2022

(87) PCT Pub. No.: WO2021/153375
PCT Pub. Date: Aug. 5, 2021

(65) Prior Publication Data
US 2023/0043772 A1 Feb. 9, 2023

(30) Foreign Application Priority Data
Jan. 29, 2020 (JP) .................. 2020-012300

(51) Int. Cl.
G06F 18/21 (2023.01)
G06F 16/335 (2019.01)
G06F 16/383 (2019.01)

(52) U.S. Cl.
CPC .......... *G06F 16/383* (2019.01); *G06F 16/335* (2019.01); *G06F 18/21* (2023.01)

(58) Field of Classification Search
CPC .................................................. G06F 16/383

USPC .......................................................... 709/224
See application file for complete search history.

(56) References Cited

U.S. PATENT DOCUMENTS

2011/0270826 A1* 11/2011 Cha .................. G06F 16/93
707/723

FOREIGN PATENT DOCUMENTS

| JP | 2005202535 A | * 7/2005 | ......... G06F 17/3071 |
|---|---|---|---|
| JP | 2007-265009 | 10/2007 | |
| JP | 2009-146213 | 7/2009 | |
| JP | 2012-252547 | 12/2012 | |

(Continued)

OTHER PUBLICATIONS

International Preliminary Report on Patentability for PCT/JP2021/001852 mailed on Aug. 11, 2022.

(Continued)

*Primary Examiner* — Sibte H Bukhari
(74) *Attorney, Agent, or Firm* — IPUSA, PLLC (57) ABSTRACT A technique for arranging nodes on a landscape based on a viewpoint desired by a user is provided. One aspect of the present disclosure relates to a node processing apparatus for synthesizing and extracting feature quantities that meet the needs of a user analysis from a plurality of types of feature quantities assigned for each node of a node set, and the node processing apparatus includes a receiving unit configured to receive, from a user, a designation related to an arrangement of nodes selected from the node set on an analysis axis assumed by the user, and a node processing unit configured to synthesize and extract feature quantities based on the arrangement of the received designation.

10 Claims, 13 Drawing Sheets

(56) References Cited

FOREIGN PATENT DOCUMENTS

| | | |
|---|---|---|
| JP | 2013-114597 | 6/2013 |
| JP | 2013114597 A * | 6/2013 |

OTHER PUBLICATIONS

International Search Report for PCT/JP2021/001852 mailed on Apr. 20, 2021.

* cited by examiner

| PATENT NUMBER \ IPC ITEM | IPC_A | IPC_B | IPC_C | ... |
|---|---|---|---|---|
| aaa | 0 | 1 | 0 | |
| bbb | 1 | 1 | 0 | |
| ccc | 1 | 0 | 0 | |

(b)

| CLUSTER \ IPC ITEM | IPC_A | IPC_B | IPC_C | ... |
|---|---|---|---|---|
| CLUSTER 1 AAA/BBB... | 1 | 2 | 0 | |
| CLUSTER 2 CCC/DDD... | 10 | 5 | 6 | |
| CLUSTER 3 XXX/YYY... | 5 | 0 | 5 | |

NODE PROCESSING APPARATUS, NODE PROCESSING METHOD AND PROGRAM

TECHNICAL FIELD

The present disclosure relates to a node processing apparatus, a node processing method, and a program.

BACKGROUND ART

Conventionally, a landscape, configured by defining the proximity between patent documents based on keywords, classification information, and the like, and mapping respective patent documents as nodes, is proposed. In such a landscape, the positional relationship between the patent documents is determined based on predefined feature quantities such as the term frequency, the commonality of technical fields, and the like.

RELATED ART DOCUMENT

Patent Document

[Patent Document 1] Japanese Laid-open Patent Application Publication No. 2009-146213

SUMMARY OF THE INVENTION

Problem to be Solved by the Present Disclosure

The present disclosure proposes a technique for arranging nodes on a landscape based on a viewpoint desired by a user.

Means for Solving Problem

One aspect of the present disclosure relates to a node processing apparatus for synthesizing and extracting feature quantities that meet the needs of a user analysis from a plurality of types of feature quantities assigned for each node of a node set, and the node processing apparatus includes a receiving unit configured to receive, from a user, a designation related to an arrangement of nodes selected from the node set on an analysis axis assumed by the user, and a node processing unit configured to synthesize and extract feature quantities based on the arrangement of the received designation.

According to this aspect, nodes can be arranged on the landscape based on the viewpoint desired by the user.

According to one embodiment, the node processing unit may cluster the nodes by using the proximity with respect to the feature quantities.

According to the present embodiment, a group of nodes that are technically relevant can be clustered.

In one embodiment, the node processing unit may determine the order of the nodes in accordance with the extracted feature quantities and display the positional relationship of the nodes according to the order.

In one embodiment, the node processing unit may select a feature quantity that minimizes the deviation with respect to the designated position of the node from the feature quantities or the synthesized feature quantities for each node.

In one embodiment, the node processing unit may configure and extract the feature quantities from the remaining feature quantities by using the designated position of the node as the restriction condition.

In one embodiment, the receiving unit may display the nodes on a map based on a predetermined features quantity and receive the designation related to the arrangement on the displayed map.

According to the present embodiment, a user can easily rearrange the nodes on the map, such as a landscape.

In one embodiment, the receiving unit may receive the designation related to the arrangement by receiving coordinates to which nodes are moved.

In one embodiment, the receiving unit may receive the designation related to the arrangement by a user operation that moves nodes that are arranged on a map and that are selected by a user, on the map by using an operation means.

Another aspect of the present disclosure relates to a node processing method for synthesizing and extracting feature quantities that meet needs of a user analysis from a plurality of types of feature quantities assigned for each node of a node set, and the node processing method includes a step of receiving, by a processor, from a user, a designation related to an arrangement of nodes on an analysis axis assumed by the user, the nodes being selected from the node set, a step of synthesizing and extracting, by the processor, feature quantities based on the arrangement of the received designation.

According to the present embodiment, the nodes can be arranged on the landscape based on the viewpoint desired by the user.

Another aspect of the present disclosure relates to a program for synthesizing and extracting feature quantities that meet needs of a user analysis from a plurality of types of feature quantities assigned for each node of a node set, and the program causes a computer to receive from a user, a designation related to an arrangement of nodes on an analysis axis assumed by the user, the nodes being selected from the node set, synthesize and extract feature quantities based on the arrangement of the received designation.

According to present embodiment, the nodes can be arranged on the landscape based on the viewpoint desired by the user.

EMBODIMENT FOR CARRYING OUT THE INVENTION

In the following, an embodiment will be described.

Outline of the Present Disclosure

In the embodiment described below, a node processing apparatus used to analyze a relationship between documents such as patent documents, technical documents, academic papers, and the like, which are expressed as nodes, is disclosed.

Figure 1:
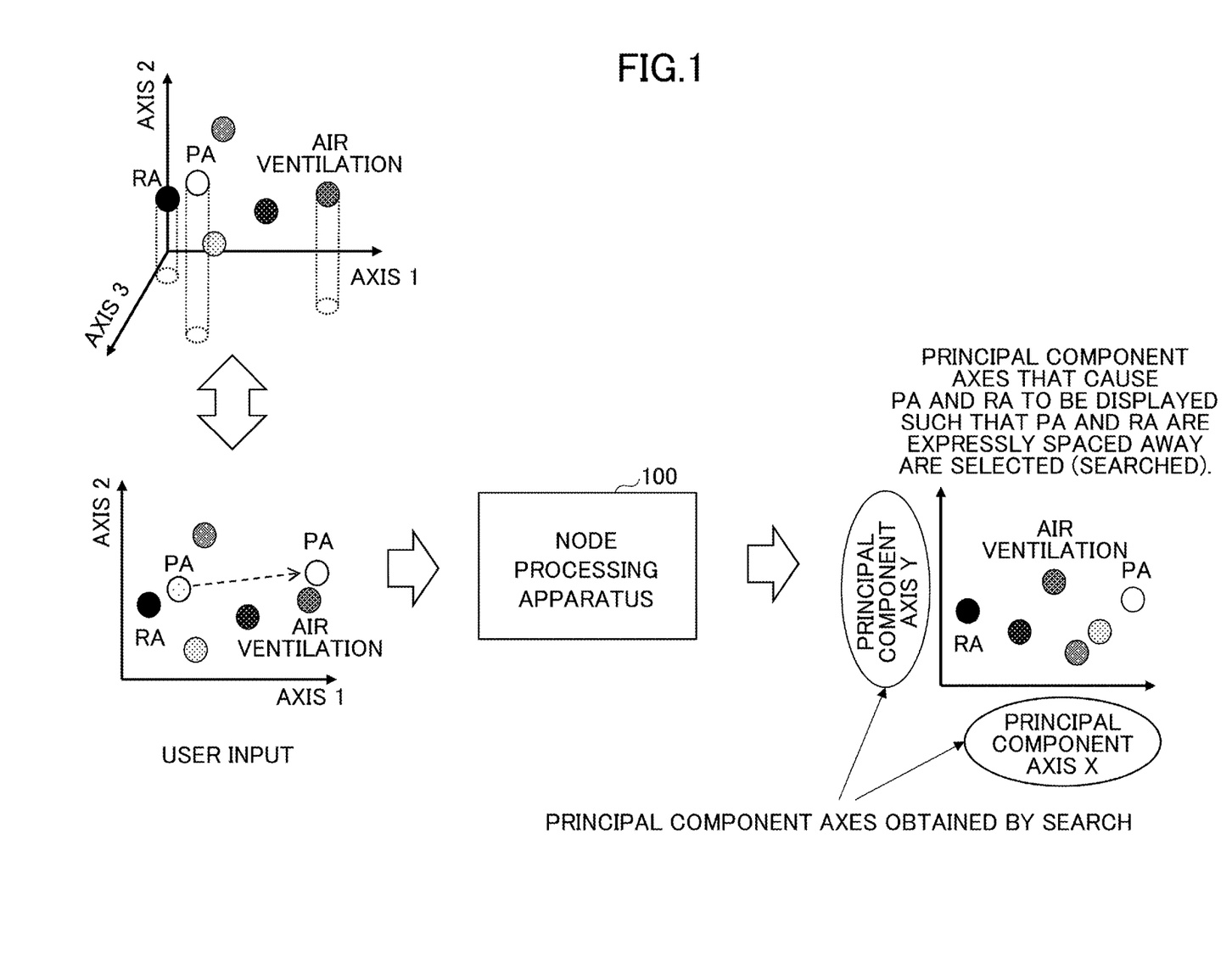
FIG. 1 is a schematic drawing illustrating node processing according to one embodiment of the present disclosure.

As illustrated in FIG. 1, when patent documents are provided as nodes, a node processing apparatus 100 according to the embodiment of the present disclosure arranges respective nodes, based on feature quantities, such as an international patent classification (IPC) representing the technical field and appearance frequency of keywords appearing in the patent documents, on a coordinate space having respective feature quantities as axes, and displays the nodes as a landscape, to a user. In the embodiment illustrated in the drawing, nodes classified into respective technical fields of the room air conditioner (PA), the package air conditioner (PA), and the air ventilation are plotted on a three-dimensional space based on the feature quantities.

When the user changes a relative positional relationship of any two or more nodes in the three-dimensional space where the nodes are plotted, the node processing apparatus 100 performs principal component analysis to search for a principal component axis corresponding to the operation performed by the user, and rearranges the nodes on the selected principal component axes and displays the nodes to the user. For example, as illustrated, the user moves the position of PA such that PA is spaced apart from RA with respect to the nodes plotted on two axes, and then the node processing apparatus 100 performs principal component analysis to search for principal component axes suitable for the space generated by the user and rearranges the nodes with respect to the principal component axes on which the PA and RA are spaced apart.

This allows the user to obtain a landscape rearranged based on the selected positional relationship.

[Node Processing Apparatus]

Figure 2:
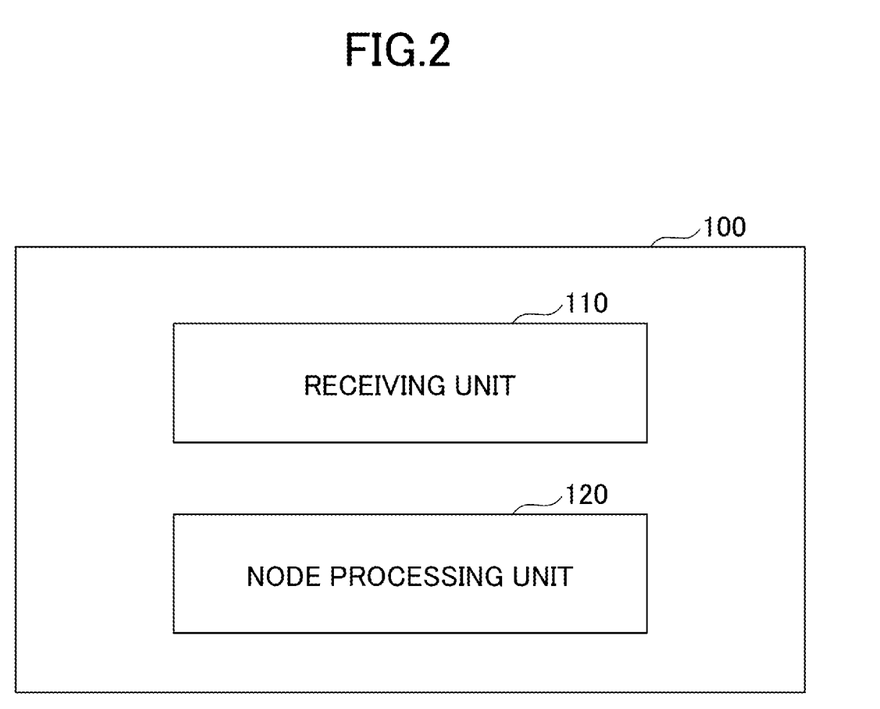
FIG. 2 is a block diagram illustrating a functional configuration of a node processing apparatus according to one embodiment of the present disclosure.

First, the node processing apparatus 100 according to one embodiment of the present disclosure will be described with reference to FIGS. 2 to 7. The node processing apparatus 100 according to the present embodiment synthesizes and extracts feature quantities that meet the needs of the user's analysis from multiple types of feature quantities assigned for each node of a node set. FIG. 2 is a block diagram illustrating a functional configuration of the node processing apparatus 100 according to one embodiment of the present disclosure.

As illustrated in FIG. 2, the node processing apparatus 100 includes a receiving unit 110 and a node processing unit 120.

The receiving unit 110 receives, from the user, a designation related to an arrangement of nodes selected from the node set on an analysis axis assumed by the user. For example, the receiving unit 110 receives multiple patent documents as the node set and passes the received patent documents to the node processing unit 120. Then, when the node processing unit 120 maps respective patent documents into a multidimensional space based on feature quantities of the patent documents (e.g., an IPC, the appearance frequency of keywords, and the like), the receiving unit 110 displays a patent document group plotted on a two-dimensional or three-dimensional space selected by the user or on a predetermined two-dimensional or three-dimensional space, as a landscape, and receives an operation of the node arrangement performed by the user on the landscape. For example, as described above, with respect to a node set arranged on any two axes selected by the user, the receiving unit 110 receives a user operation, such as separating any two nodes apart, and passes the received user operation to the node processing unit 120.

The node processing unit 120 synthesizes and extracts the feature quantity based on the arrangement of the received designation. Specifically, when the node processing unit 120 acquires the patent documents as the node set from the receiving unit 110, the node processing unit 120 acquires patent information about each patent document (for example, text in the specification and the claims, bibliographic items, classification symbols of the IPC, and the like) and holds the acquired patent information.

Figure 3:
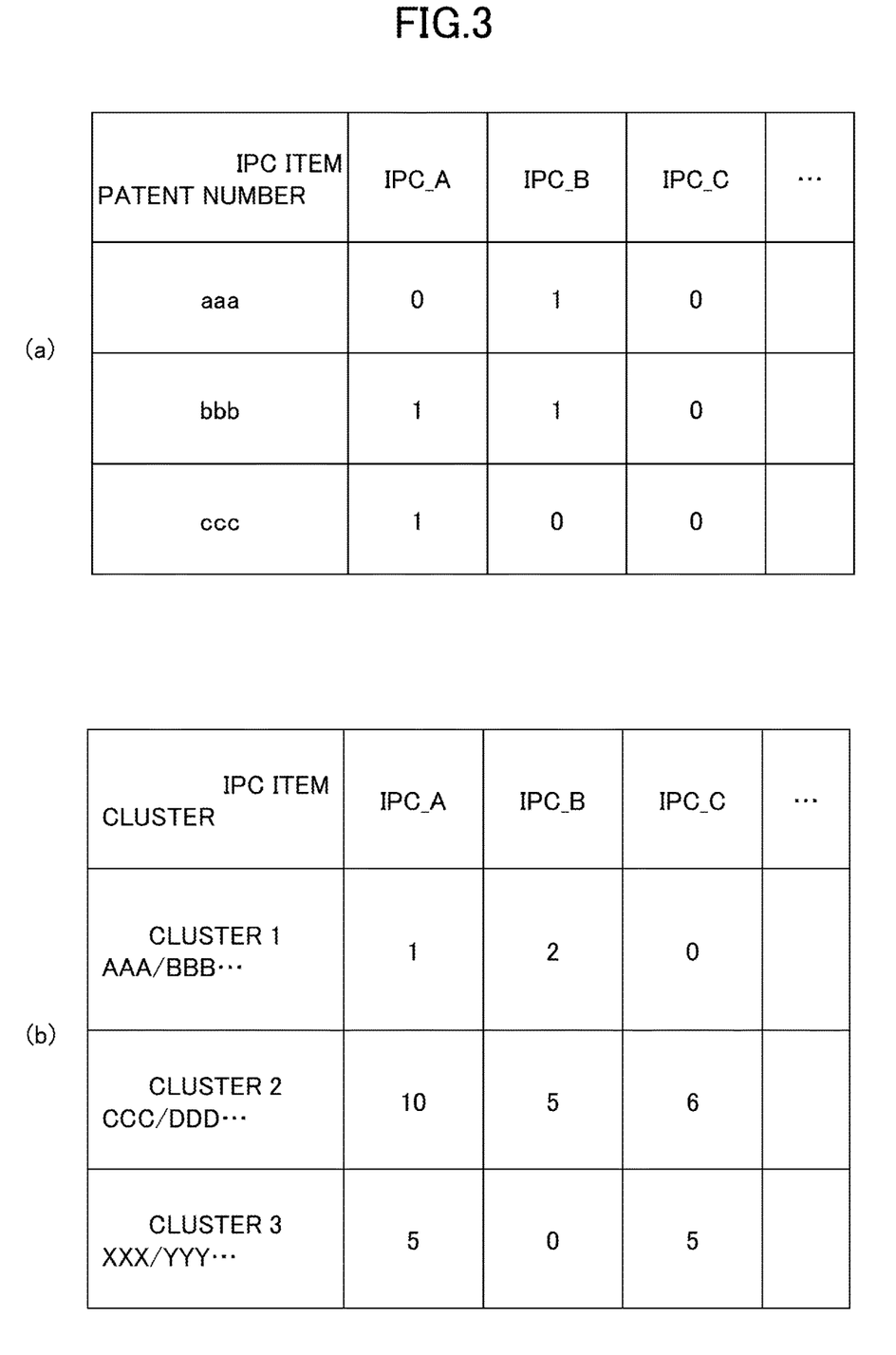
FIG. 3 is drawings illustrating the featurization of nodes according to one embodiment of the present disclosure.

For example, the node processing unit 120 may store the IPC of each patent document in a table format as illustrated in FIG. 3(a). In a specific example illustrated in FIG. 3(a), information indicating that a patent document of the patent number "aaa" is classified into "IPC_B" is stored in the table. Additionally, information indicating that a patent document of the patent number "bbb" is classified into "IPC_A" and "IPC_B" is stored, and information indicating that a patent document of the patent number "ccc" is classified into "IPC_A" is stored. As described, the IPC classification can be quantified as the feature quantity.

Alternatively, the node processing unit 120 may store the IPC for each cluster of patent documents in a table format as illustrated in FIG. 3(b). Specifically, the node processing unit 120 may cluster the nodes by using proximity depending on the feature quantity. In the specific example illustrated in FIG. 3(b), information indicating that patent documents of the patent number "AAA" and the patent number "BBB", . . . are classified into a cluster 1, one of the patent documents of the cluster 1 is classified into "IPC_A", and two are classified into "IPC_B" is stored. Additionally, information indicating that patent documents of the patent number "CCC", the patent number "DDD", . . . are classified into a cluster 2, 10 of the patent documents of the cluster 2 are classified into "IPC_A", 5 are classified into "IPC_B", and 6 are classified into "IPC_C" is stored. Similarly, information indicating that patent documents of the patent number "XXX", the patent number "YYY", . . . are classified into a cluster 3, five of the patent documents of the cluster 3 are classified into "IPC_A" and five are classified into "IPC_C" is stored. As described, the total number of the IPC classifications can be quantified as the feature quantity.

Figure 4:
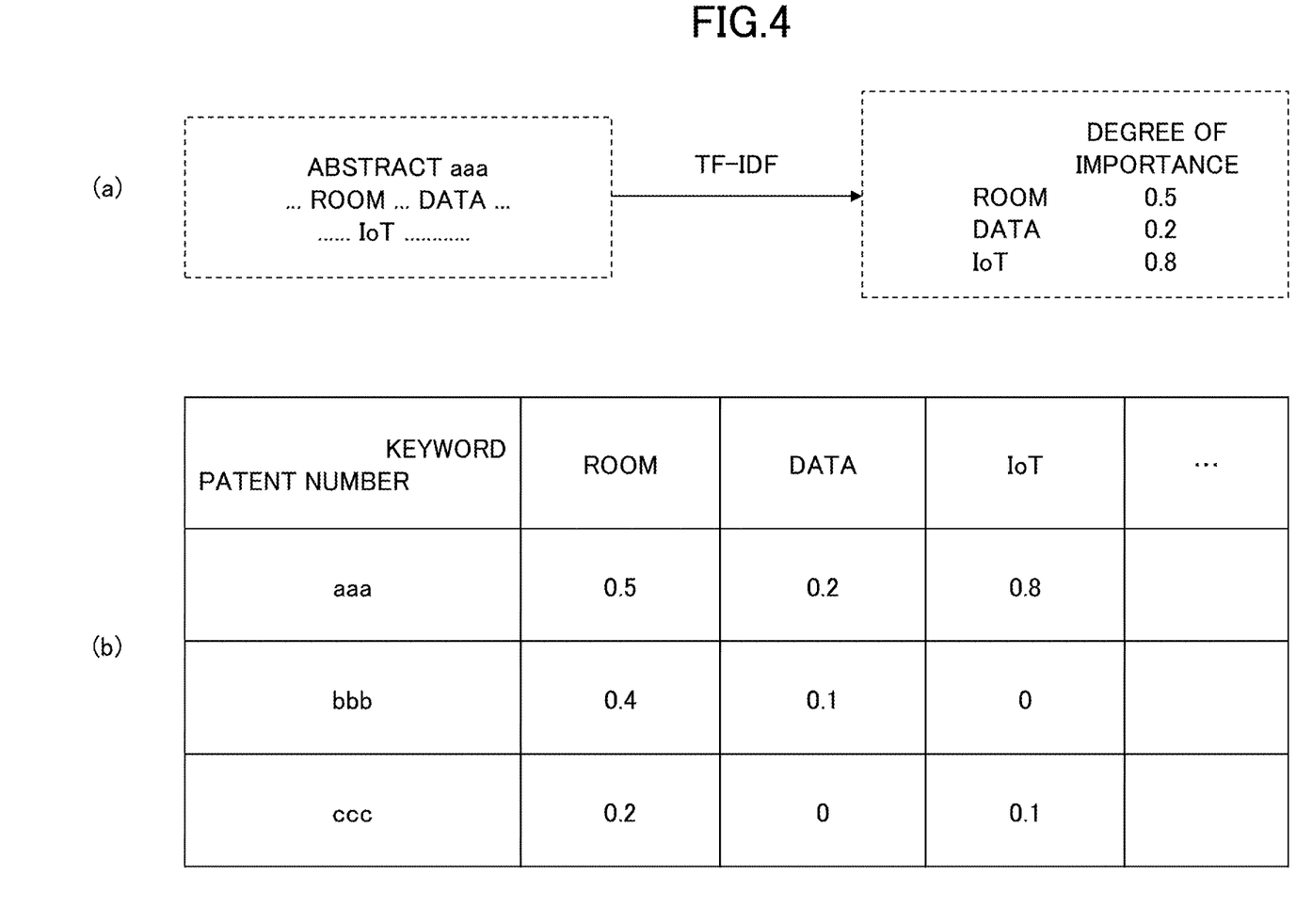
FIG. 4 is drawings illustrating the featurization of the nodes according to one embodiment of the present disclosure.

The node processing unit 120 may featurize a quantity by using keywords in the description of the specification and the like, in accordance with the degree of importance as illustrated in FIG. 4(a). The degree of importance of a term may be quantified, for example, according to Term Frequency-Inverse Document Frequency (TF-IDF), which is a known method for term weighting. According to TF-IDF, the degree of importance of each term, such as "room", "data", and "IoT", can be determined based on the description of the specification and the like, as illustrated. For example, when the degree of importance is determined for each patent document, the node processing unit 120 may store the feature quantity of each patent document in a table format as illustrated in FIG. 4(b). Here, when the feature quantity is determined for each cluster, the average value of the feature quantities of the patent documents within the cluster or the like may be used as the feature quantity of the cluster. Additionally, instead of the degree of importance or in addition to the degree of importance, the term frequency (TF) may be used as the feature quantity.

Figure 5:
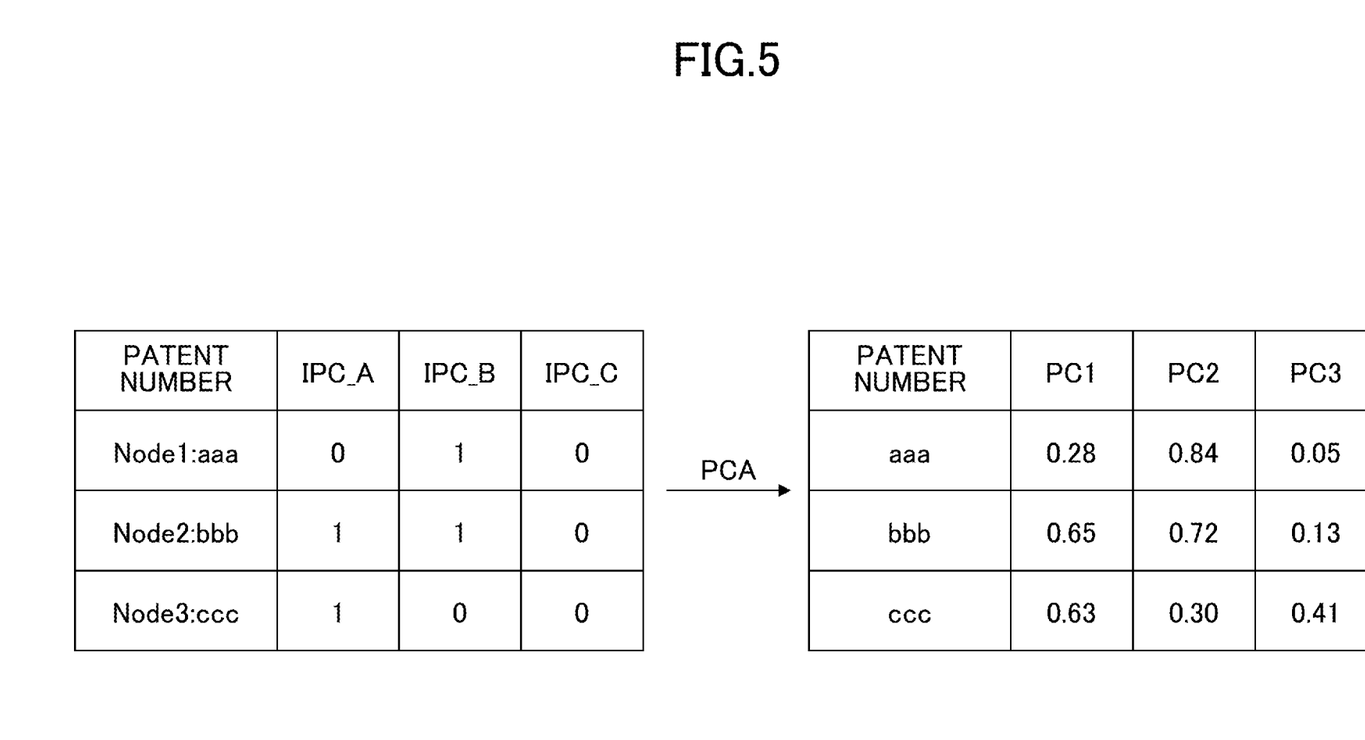
FIG. 5 is a drawing indicating the coordinates in a principal component axis according to on embodiment of the present disclosure.

The feature quantity of the patent document is calculated as described above, and then the node processing unit 120 performs the principal component analysis based on the calculated feature quantities and determines multiple principal component axes $PC_i$ (i=1, 2, ... ). For example, the number of principal component axes may correspond to eigenvalues. The node processing unit 120 selects two principal component axes from the determined principal component axes $PC_i$ and plots the node set on a two-dimensional space with respect to the selected principal component axes. For example, the node processing unit 120 can perform the principal component analysis and calculate coefficients of each patent document for three main component axes PC1, PC2, and PC3 based on the feature quantities for the IPC of each patent document as illustrated in FIG. 5. The node processing unit 120 can select any two from these principal component axes to display the node set mapped on the two-dimensional space as illustrated in FIG. 6(a).

Figure 6:
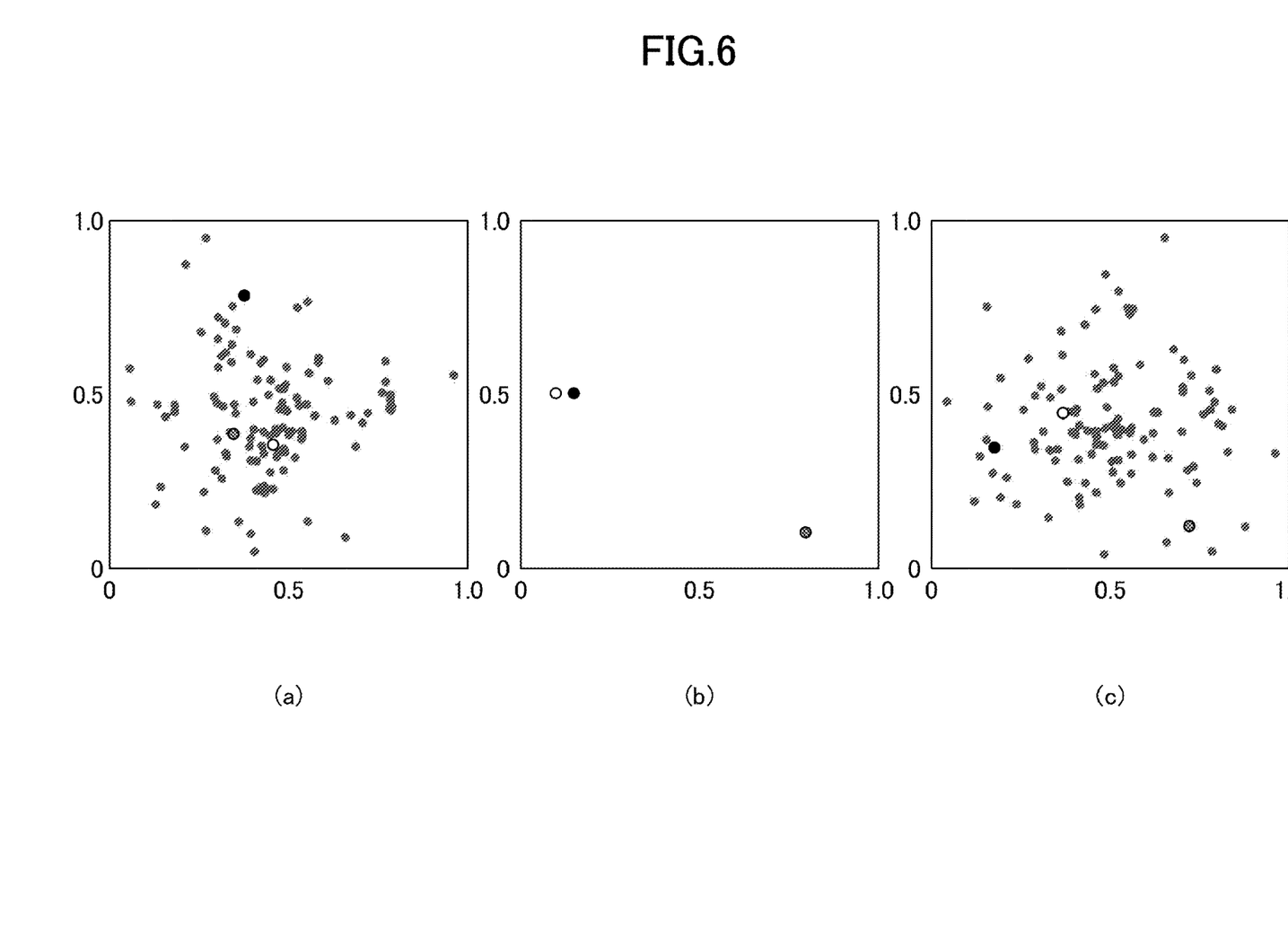
FIG. 6 is drawings indicating node arrangements visualized before and after axis selection according to one embodiment of the present disclosure.

After displaying the landscape as illustrated in FIG. 6(a), the receiving unit 110 receives the user operation to change the relative position of the specific three nodes as illustrated in FIG. 6(b), and then the node processing unit 120 rearranges the nodes in accordance with the received user operation. Specifically, the node processing unit 120 determines error with the input value and the overall variance value for all pairs of the principal component axes (considering rotation, inversion, and the like). For example, when the x-axis is set to PC1 and the y-axis is set to PC2 for the input value (coordinates), the node processing unit 120 may calculate absolute square error as the error, as described below.

$$\sqrt{(node1*PC1 - x_{node1})^2 + (node1*PC2 - y_{node1})^2} + \sqrt{(node2*PC1 - x_{node2})^2 + (node2*PC2 - y_{node2})^2}$$ [Equation 1]

Here, node1 and node2 respectively represent the coordinates of the node 1 and the node 2, PC1 and PC2 represent the coefficient vectors derived by the principal component analysis, $x_{node1}$ and $y_{node1}$ respectively represent the x coordinate and the y coordinate of the node 1, and $x_{node2}$ and $y_{node2}$ respectively represent the x coordinate and the y coordinate of the node 2. In the specific example illustrated in FIG. 5, when mapping the value of node1 to the PC1 axis, coefficients of the PC1 axis are respectively multiplied by the values of the feature quantities of node1. Therefore, the coordinate of node1 on the PC1 axis is determined by node1(IPC_A, IPC_B, IPC_C)*(PC1_A, PC1_B, PC1_C). Equation 1 is calculation to derive the error between the coordinates specified by the input ($x_{node1}$, $y_{node1}$) and the coordinates mapped by the principal component analysis (node1*PC1, node1*PC2).

The node processing unit 120 defines a cost function based on the error between the input values and the coordinates plotted on the coordinates of the principal component analysis and the overall variance value. Here, the error is calculated for some nodes specified by the input, but the variance is calculated for all nodes. Therefore, the equation is substantially the same as the equation for deriving the general two-dimensional coordinate variance. It is substantially the same as a general method of deriving principal component analysis to use the variance as a cost function so that the overall variance value becomes high (so that the amount of information in the plots becomes large). For example, the node processing unit 120 may define the cost function as follows.

Cost=A * overall variance–B * error with input Here, A and B are constants. The error between the specified node and the input value may be set small and the overall variance value may be set large. The node processing unit 120 determines the pair of the principal component axes that maximize the cost function and selects the pair of the principal component axes as the principal component axes corresponding to the user operation. As illustrated in FIG. 6(c), the node processing unit 120 maps the node set on a two-dimensional space defined by two principal component axes selected as described above and displays the generated landscape to the user.

Figure 7:
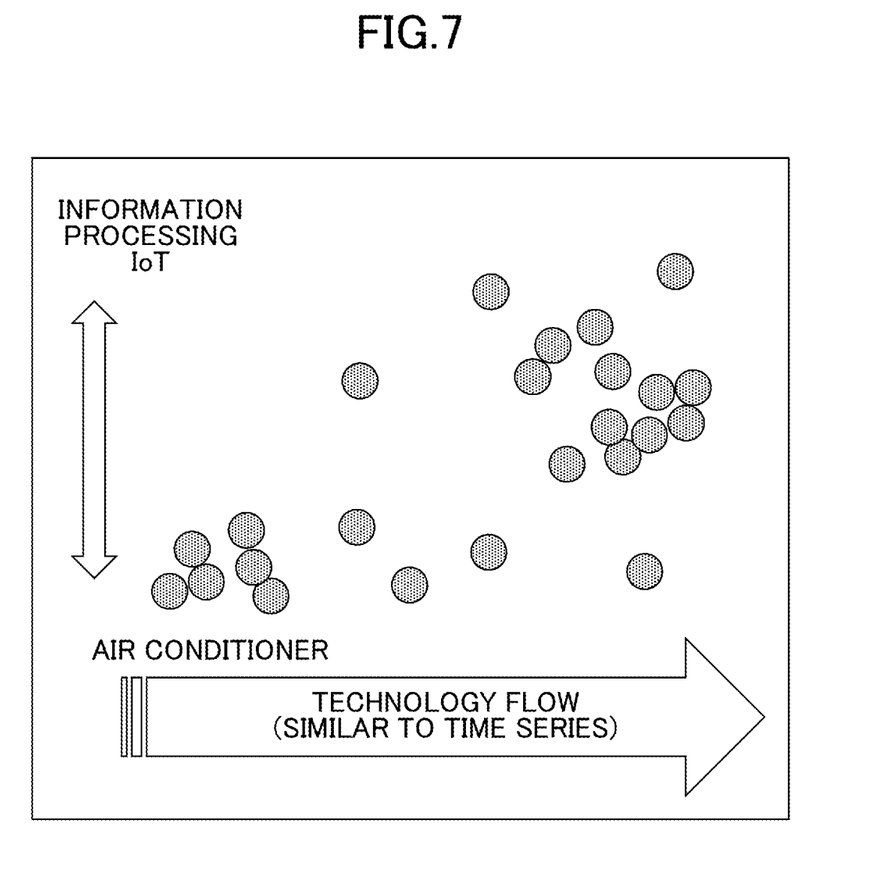
FIG. 7 is a drawing indicating a trend of technology integration according to one embodiment of the present disclosure.

As described, by generating the landscape corresponding to the user input operation, a state of fusion of the technical field of the air conditioner and the technical field of information processing as the technology advances as illustrated in FIG. 7 can be visualized. Here, it is conceivable that the horizontal axis is the transition of technology, and the vertical axis is the principal component axis indicating whether to be close to the air conditioning field or close to the information processing field. As described above, when the value is viewed only in one axis, the value is arranged in the order of smaller to larger (year order or the like). The node processing unit 120 can specify the order of the nodes based on the extracted feature quantities and display the position relationship of the nodes according to the order.

[Node Processing]

Figure 8:
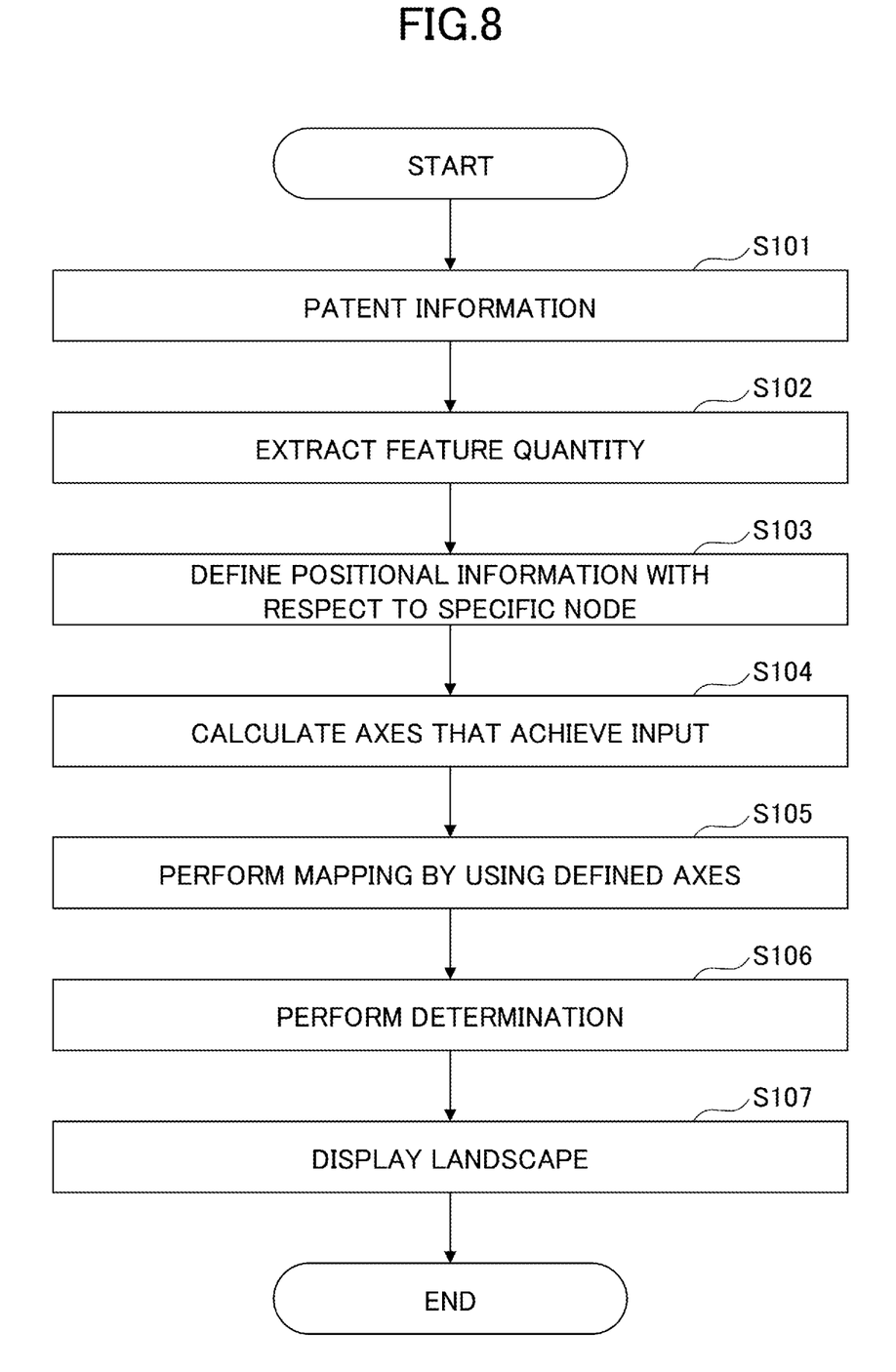
FIG. 8 is a flowchart illustrating the node processing according to one embodiment of the present disclosure.

Next, node processing according to one embodiment of the present disclosure will be described with reference to FIGS. 8 to 11. The node processing may be implemented by the node processing apparatus 100 described above, and, for example, may be implemented by a processor of the node processing apparatus 100 executing a program or an instruction. FIG. 8 is a flowchart illustrating the node processing according to one embodiment of the present disclosure.

As illustrated in FIG. 8, in step S101, the node processing apparatus 100 acquires the patent information about the patent document. For example, the node processing apparatus 100 may acquire, from a database or the like, texts in the specification and the claims of the patent document, bibliographic items, classification symbols of the IPC, and the like, for the patent document provided by the user or the like, as the patent information.

In step S102, the node processing apparatus 100 extracts the feature quantity of the patent document from the patent information. For example, the node processing apparatus 100 may calculate the feature quantity based on the IPC or the keyword in the acquired patent information for each cluster including a patent document or multiple patent documents. Additionally, the node processing unit 120 may configure and extract the feature quantity from the all feature quantities under the restriction condition of the designated position of the node. That is, the node processing unit 120 may determine the coordinates of all nodes by using the determined feature quantities and coefficients of the feature quantities.

In step S103, the node processing apparatus 100 performs the principal component analysis on the patent documents to be mapped based on the extracted feature quantities to determine a predetermined number of principal component axes, and maps the patent documents to a two-dimensional space with two principal component axes selected from these principal component axes.

Figure 9:
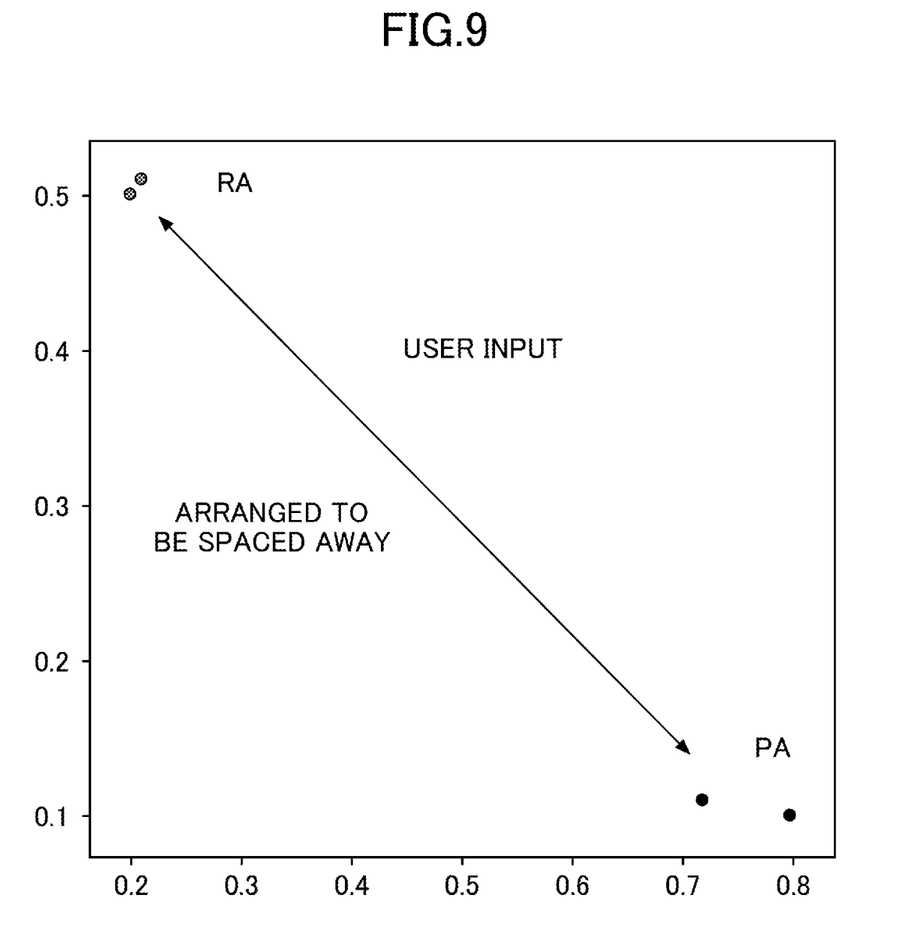
FIG. 9 is a drawing indicating a user input operation according to one embodiment of the present disclosure.

In step S104, the node processing apparatus 100 displays, to the user, the landscape indicating the patent documents that are mapped on the two-dimensional space generated in step S103. Then, when receiving an input operation from the user, such as an arrangement change operation to the patent documents on the landscape, the node processing apparatus 100 searches for the principal component axes corresponding to the node position after the arrangement change. For example, the user may perform the arrangement change operation by changing the position of one or both of the RA node and the PA node such that the RA node and the PA node are spaced apart, as illustrated in FIG. 9.

In step S105, the node processing apparatus 100 determines the principal component axes appropriate for the node positions after the arrangement change and rearranges respective nodes on the determined principal component axes. The node processing apparatus 100 searches for a pair of the principal component axes corresponding to the node positions after the change.

In step S106, the node processing apparatus 100 calculates the cost of each pair of the principal component axes and determines the pair of the principal component axes that minimizes the cost as the optimum principal component axes. Here, other than the principal component analysis, there may be a method in which high-dimensional feature quantities are dimensionally compressed and displayed in two dimensions. To achieve a specified plot, for example, it is conceivable that the deviation with respect to the input can be reduced by reducing the 500 feature quantities to 100 feature quantities that are important and performing the principal component analysis. In order to achieve an optimal plot, a feature quantity is selected, and a feature quantity with a coefficient of 0 as a result of the principal component analysis is not required to be selected. Thus, the node processing unit 120 may select a feature quantity that minimizes the deviation with respect to the designated position of the node based on the feature quantity or the synthesized feature quantity for each node.

Figure 10:
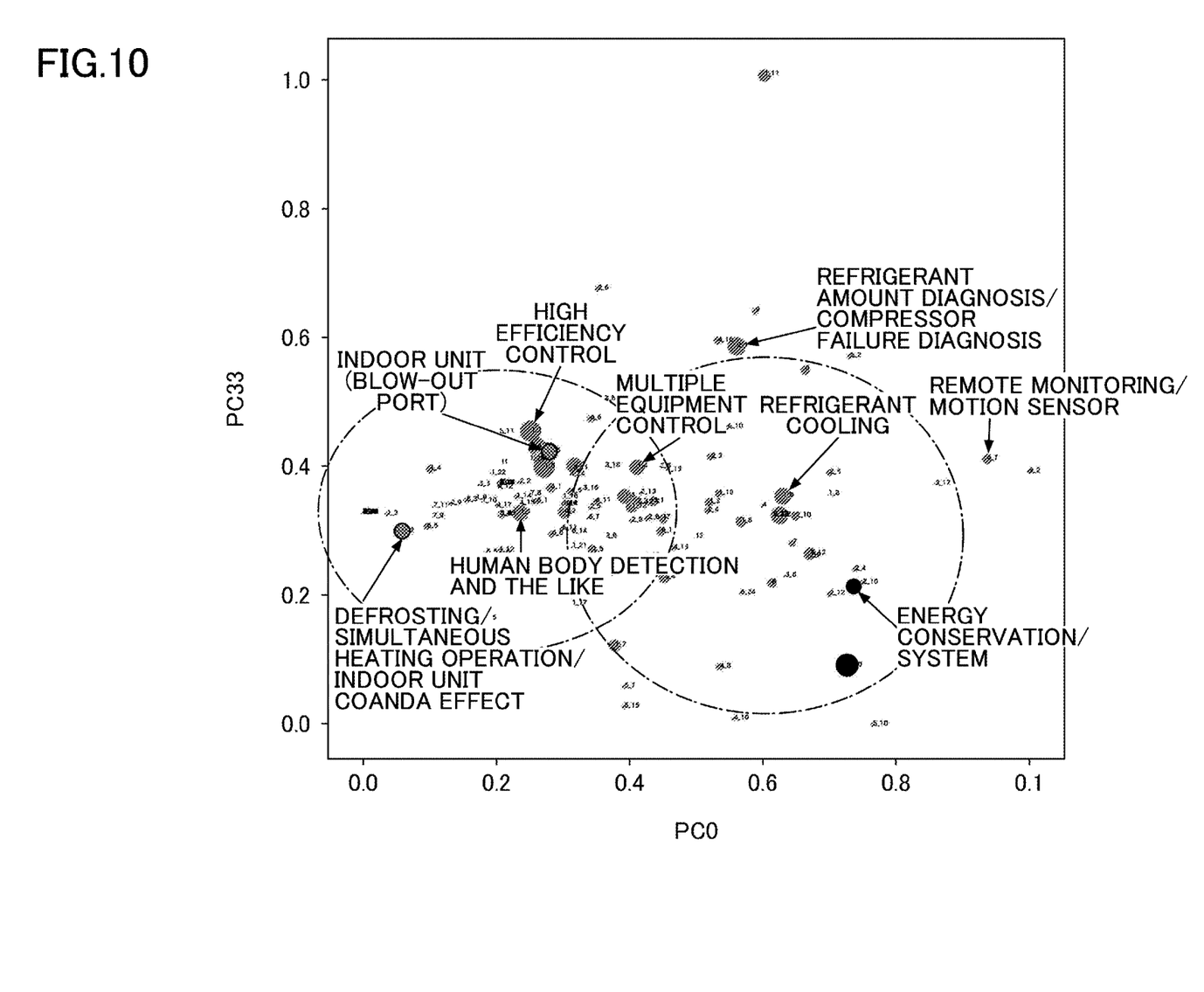
FIG. 10 is a drawing indicating a generated landscape according to one embodiment of the present disclosure.

In step S107, the node processing apparatus 100 displays, to the user, a landscape with the determined optimum principal component axes. For example, the node processing apparatus 100 may generate a landscape as illustrated in FIG. 10, for the user's rearrangement operation.

Figure 11:
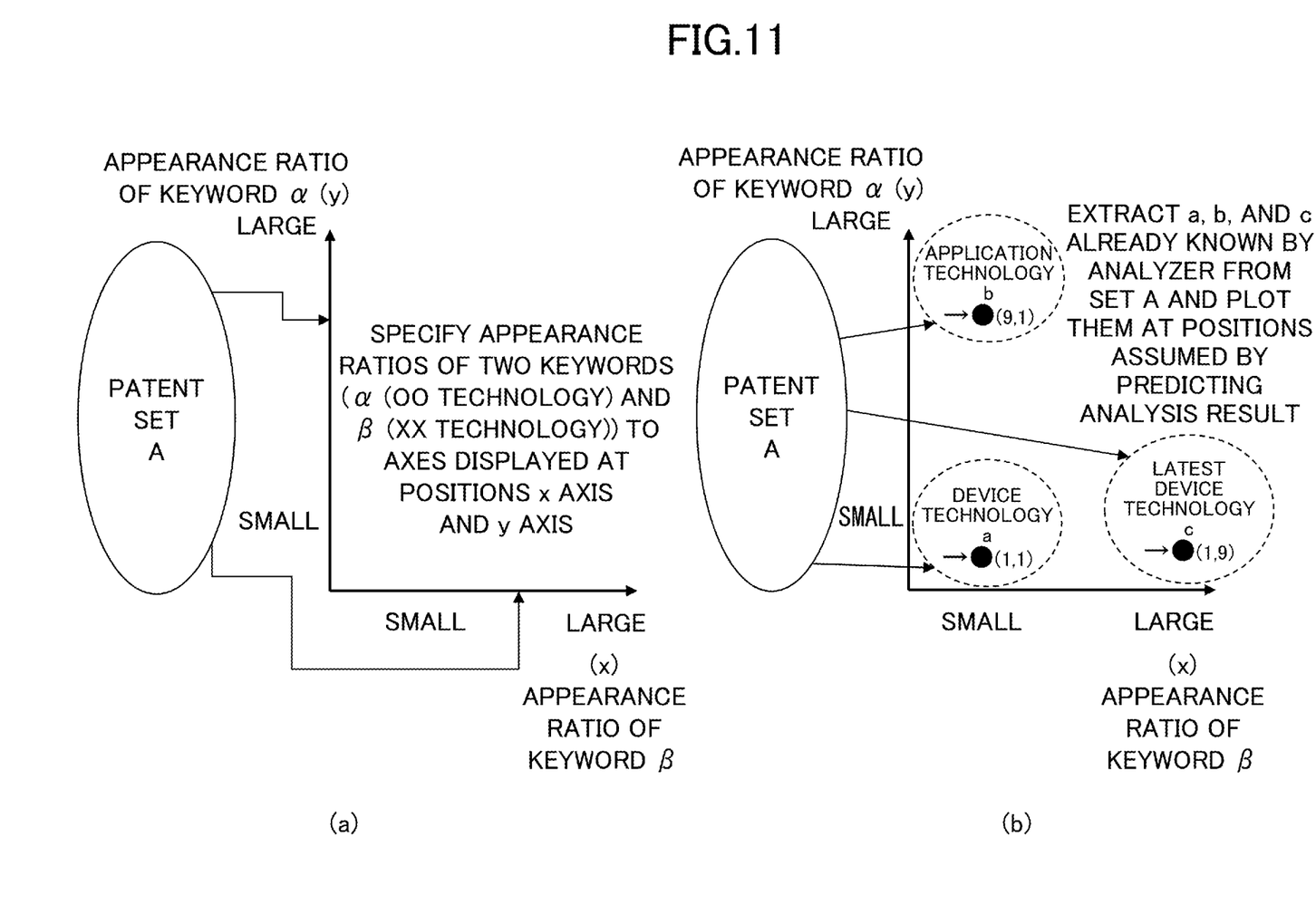
FIG. 11 is schematic diagrams illustrating a user operation example according to one embodiment of the present disclosure.

According to the node processing described above, for example, when displaying the patent information on the landscape, the node processing apparatus 100 clusters the patent documents based on the keywords and the similarities to create a patent set A as illustrated in FIG. 11(*a*). The node processing apparatus 100 arranges each patent document on a landscape with a tag indicating the characteristics of the patent document associated with each patent document. For example, the landscape may be defined by the x-axis and the y-axis representing the appearance frequency of any two keywords, and each patent document may be arranged according to the corresponding appearance frequency.

In the landscape, each patent document is arranged according to the appearance frequency of the configured two keywords, but the user may desire to configure the axes of the landscape by himself/herself according to the content to be analyzed. For example, the desired distribution of the user can be transmitted to the node processing apparatus 100 by allowing the user to assume a distribution that is likely to occur when the display positions of a small number of patent documents of the patent set A are analyzed according to the analysis contents of the user and to specify the distribution. For example, as illustrated in FIG. 10(*b*), the user specifies, by the coordinates, a position that the user desires to obtain as a result of the analysis of several patent documents known to the user in the patent set A. In the illustrated specific example, when a is device technology, b is application technology, and c is latest device technology, it is assumed that a is specified as coordinates (1,1), b is specified as coordinates (1,9), and c is specified as coordinates (9,1).

Figure 12:
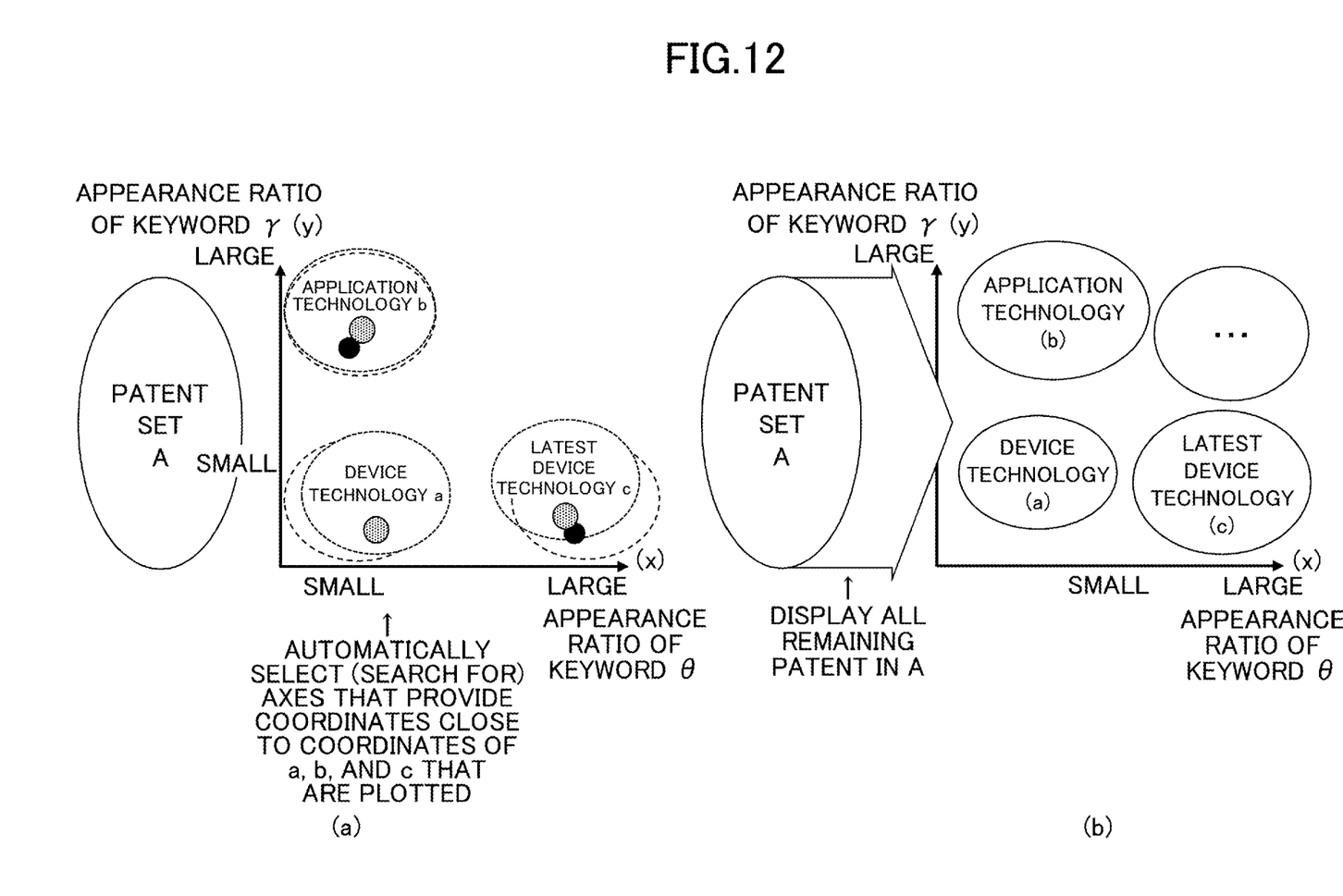
FIG. 12 is schematic diagrams illustrating a user operation example according to one embodiment of the present disclosure.

In response to this user-specified operation, the node processing apparatus 100 selects the principal component axes for the display at the positions close to the specified coordinates as illustrated in FIG. 12(*a*). Additionally, the node processing apparatus 100 may synthesize the principal component axes and select the synthesized axis. As illustrated in FIG. 12(*b*), the node processing apparatus 100 maps each patent document of the patent set A to a two-dimensional space on the selected principal component axes and displays the generated landscape to the user.

[Hardware Configuration of Node Processing Apparatus]

Figure 13:
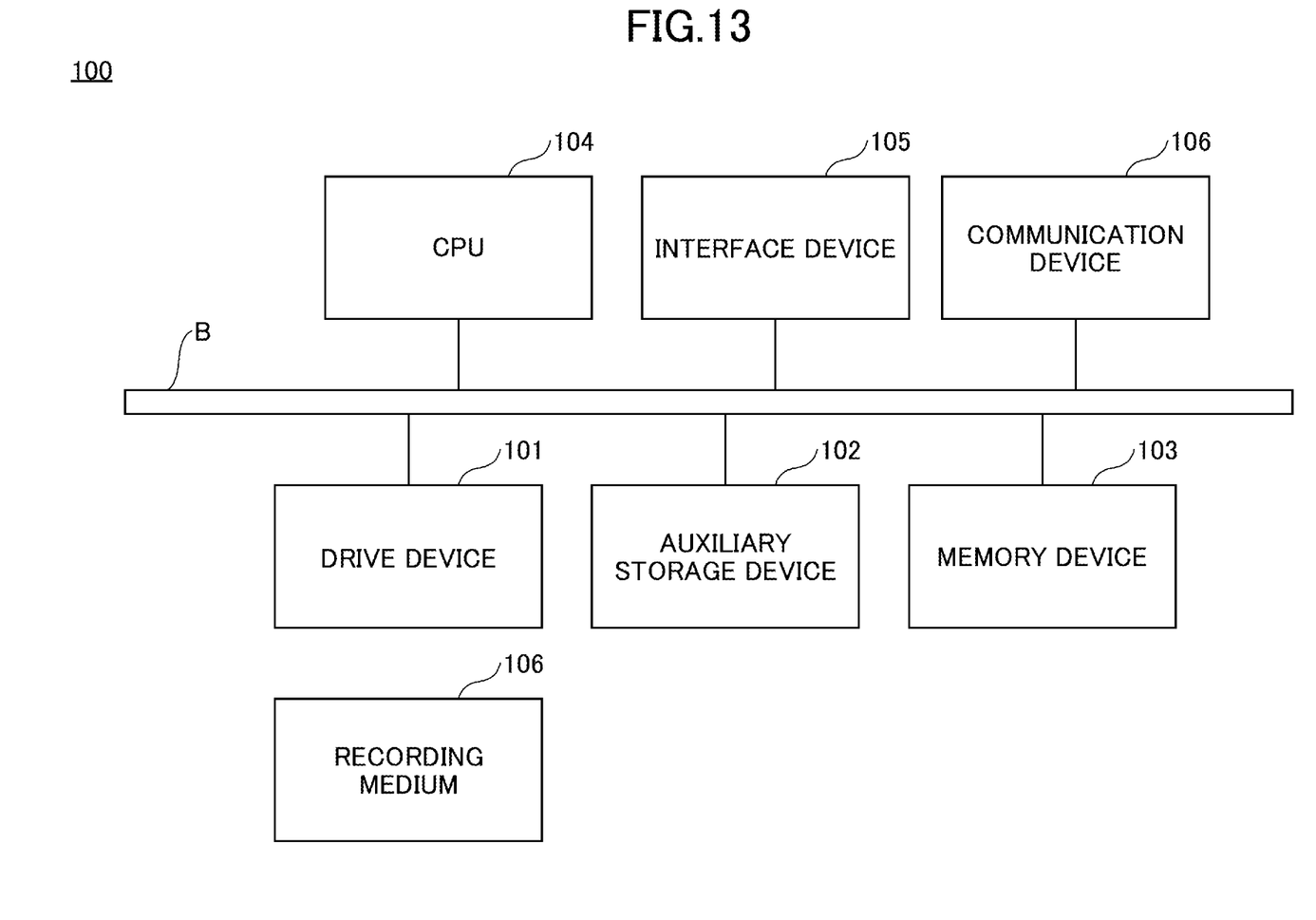
FIG. 13 is a block diagram illustrating a hardware configuration of the node processing apparatus according to one embodiment of the present disclosure.

The node processing apparatus 100 may, for example, have a hardware configuration as illustrated in FIG. 13. That is, the node processing apparatus 100 includes a drive device 101, an auxiliary storage device 102, a memory device 103, a central processing unit (CPU) 104, an interface device 105, and a communication device 106, interconnected through a bus B.

Various computer programs including programs for implementing the above-described functions and processing in the node processing apparatus 100 may be provided by a recording medium 107, such as a compact disc-read only memory (CD-ROM). When the recording medium 107 in which the programs are stored is set to the drive device 101, the programs are installed in the auxiliary storage device 102 from the recording medium 107 through the drive device 101. However, the program need not necessarily be installed from the recording medium 107, and may be downloaded from any external device through a network or the like. The auxiliary storage device 102 stores the installed program and stores necessary files, data, and the like. The memory device 103 reads and stores the program and data from the auxiliary storage device 102 in response to receiving an instruction to start the program. The CPU 104, which functions as a processor, performs various functions and the processing of the node processing apparatus 100 described above according to various data such as the program stored in the memory device 103 and the parameter necessary for executing the program. The interface device 105 is used as a communication interface for connecting to a network or an external device. The communication device 106 performs various communication processing for communicating with an external device.

However, the node processing apparatus 100 is not limited to the hardware configuration described above, but may be implemented in a hardware configuration such as any other suitable circuit.

Although the embodiment has been described, it will be understood that many modifications of the form and the details can be made without departing from the spirit and scope of the claims.

This application is based upon claims the priority to Japanese Patent Application No. 2020-012300, filed Jan. 29, 2020, the entire contents of which are hereby incorporated by reference.

DESCRIPTION OF THE REFERENCE NUMERALS 100 node processing apparatus
110 receiving unit
120 node processing unit

The invention claimed is:

1. A node processing apparatus for synthesizing and extracting feature quantities that meet needs of a user analysis from a plurality of types of feature quantities assigned for each node of a node set, the node processing apparatus comprising:
a processor configured to:
receive, from a user, a designation related to relative positional relationship of two or more nodes on an analysis axis assumed by the user, the two or more nodes being selected from the node set; and
synthesize and extract feature quantities on the analysis axis from a plurality of types of feature quantities assigned for each node of the two or more nodes based on the arrangement of the received designation, thereby reducing number of dimensions of the synthesized and extracted feature quantities, as compared to the number of the dimensions of the plurality of types of the feature quantities before the synthesizing and the extracting are performed.

2. The node processing apparatus as claimed in claim 1, wherein the processor clusters nodes by using proximity according to the feature quantities.

3. The node processing apparatus as claimed in claim 1, wherein the processor determines an order of nodes in accordance with the extracted feature quantities and displays a positional relationship of the nodes according to the order.

4. The node processing apparatus as claimed in claim 1, wherein the processor selects a feature quantity that minimizes deviation with respect to a designated position of the node from the feature quantities or the synthesized feature quantities for each node.

5. The node processing apparatus as claimed in claim 1, wherein the processor configures and extracts the feature quantities by using a designated position of the node as a restriction condition.

6. The node processing apparatus as claimed in claim 1, wherein the processor nodes on a map based on a predetermined feature quantity and receives the designation related to the arrangement on the displayed map.

7. The node processing apparatus as claimed in claim 1, wherein the processor receives the designation related to the arrangement by receiving coordinates to which nodes are to be moved.

8. The node processing apparatus as claimed in claim 1, wherein the processor receives the designation related to the arrangement by a user operation that moves nodes that are arranged on a map and that are selected by the user, on the map by using operation means.

9. A node processing method for synthesizing and extracting feature quantities that meet needs of a user analysis from a plurality of types of feature quantities assigned for each node of a node set, the node processing method comprising:
a step of receiving, by a processor, from a user, a designation related to relative positional relationship of two or more nodes on an analysis axis assumed by the user, the two or more nodes being selected from the node set; and
a step of synthesizing and extracting, by the processor, feature quantities on the analysis axis from a plurality of types of feature quantities assigned for each node of the two or more nodes based on the arrangement of the received designation, thereby reducing number of dimensions of the synthesized and extracted feature quantities, as compared to the number of the dimensions of the plurality of types of the feature quantities before the synthesizing and the extracting are performed.

10. A non-transitory computer-readable storage medium having stored therein a program for synthesizing and extracting feature quantities that meet needs of a user analysis from a plurality of types of feature quantities assigned for each node of a node set, the program causing a computer to:
receive from a user, a designation related to relative positional relationship of two or more nodes on an analysis axis assumed by the user, the two or more nodes being selected from the node set; and
synthesize and extract feature quantities on the analysis axis from a plurality of types of feature quantities assigned for each node of the two or more nodes based on the arrangement of the received designation, thereby reducing number of dimensions of the synthesized and extracted feature quantities, as compared to the number of the dimensions of the plurality of types of the feature quantities before the synthesizing and the extracting are performed.

* * * * *